US009255994B2

(12) United States Patent
Young

(10) Patent No.: US 9,255,994 B2
(45) Date of Patent: Feb. 9, 2016

(54) MULTIPHASE CODE GENERATOR AND GNSS RECEIVER

(75) Inventor: Philip John Young, Northhampton (GB)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 12/678,273

(22) PCT Filed: Oct. 9, 2008

(86) PCT No.: PCT/EP2008/063573
§ 371 (c)(1),
(2), (4) Date: Mar. 15, 2010

(87) PCT Pub. No.: WO2009/050109
PCT Pub. Date: Apr. 23, 2009

(65) Prior Publication Data
US 2010/0195773 A1    Aug. 5, 2010

(30) Foreign Application Priority Data
Oct. 16, 2007    (EP) ........................................ 0711856

(51) Int. Cl.
    *G01S 19/37*    (2010.01)
(52) U.S. Cl.
    CPC ..................... *G01S 19/37* (2013.01)
(58) Field of Classification Search
    CPC ......... G01S 19/37; G01S 19/30; H04B 1/707; H04B 2201/70707
    USPC .......................................... 375/150, 316, 340
    See application file for complete search history.

(56) References Cited

U.S. PATENT DOCUMENTS 4,648,099 A * 3/1987 Kerr .................. H04B 1/707
    332/101
5,068,872 A * 11/1991 Schroter .............. G01S 11/08
    331/78

(Continued)

FOREIGN PATENT DOCUMENTS

| JP | 2003163580 A | 6/2003 |
|---|---|---|
| JP | 2003289240 A | 10/2003 |
| JP | 2007501383 A | 1/2007 |

(Continued)

OTHER PUBLICATIONS

International Search Report and Written Opinion—PCT/EP2008/063573, International Searching Authority—European Patent Office, Mar. 3, 2009.
European Search Report—EP07118586, Search Authority—Munich Patent Office, Mar. 19, 2008.

*Primary Examiner* — Freshteh N Aghdam
(74) *Attorney, Agent, or Firm* — Bala M. Ramasamy

(57) ABSTRACT

A code generator, for providing a PRN sequence in a GNSS receiver, has the capability to store an internal status at any given point of the generated sequence. The stored status can be reloaded in the generator, upon an external command, or after a given number of generation cycles, thus slewing the phase of the generated PRN sequence to the value corresponding to the stored status. A parallel-correlation GNSS receiver includes one or more slewable code generators, for successively generating local replicas of GNSS PRN sequences, having different code phases, corresponding to a plurality of candidate signals of different code and Doppler shifts. Each time the code generator must switch from one candidate to a second, it is preemptively controlled or programmed, while generating the code for the first candidate, to store the internal status at the phase point almost aligned with the start of the PRN sequence for the second candidate. When the correlation engine switches from the first candidate to the second one, the stored status is loaded in the code generator, and the small misalignment between the code generator and the desired sequence is corrected, thus setting it at the needed point in phase space. The generator and receiver of the invention are well suited to the search of several GNSS signal in parallel, and require less memory than a table-based code generator.

25 Claims, 4 Drawing Sheets

(56) References Cited

U.S. PATENT DOCUMENTS

| | | |
|---|---|---|
| 6,208,291 B1 | 3/2001 | Krasner |
| 6,421,372 B1 | 7/2002 | Bierly et al. |
| 2003/0122697 A1* | 7/2003 | Schooler et al. ............ 341/173 |
| 2006/0098721 A1 | 5/2006 | Rabaeijs et al. |
| 2007/0019715 A1* | 1/2007 | Bochkovskiy et al. ....... 375/150 |

FOREIGN PATENT DOCUMENTS

| | | |
|---|---|---|
| WO | WO2004063897 A2 | 7/2004 |
| WO | 2005013633 A1 | 2/2005 |

\* cited by examiner

MULTIPHASE CODE GENERATOR AND GNSS RECEIVER

FIELD OF THE INVENTION

The present invention concerns a satellite radiolocalization receiver and in particular, but not exclusively, a radiolocalization receiver adapted to receive and process radiolocalization signals generated by a constellation of localization satellite, like for example the satellites of the GPS, GLONASS or Galileo System or other global navigation satellite systems (GNSS). The present invention also concerns a signal processor unit adapted for treating radiolocalization signals provided by a suitable RF interface, and which can be embedded in a dedicated GNSS apparatus or in another host system, like for example a general-purpose computer, PDA or cell phone.

DESCRIPTION OF RELATED ART

The Global Navigation Satellite Systems (GNSS) generically include the Global Positioning System (GPS), operated by the United States, the Global Orbiting Navigation Satellite System (GLONASS) operated by the Russian Federation, the COMPASS (also known as Beidou-2) proposed by the Chinese government, and the projected Galileo positioning system, to be built by the European Union. Other GNSS system, to which the present invention may be applied, are under test, or will be proposed and realized in the future.

The following description and examples will often refer, for the sake of simplicity, to a GPS receiver only. It will be understood, however, that the present invention is not necessarily restricted to such a receiver, but includes also all GNSS sources, and can be extended to other future radiolocalization systems to which the invention is applicable.

GNSS radio signals are located in the UHF portion of the radio spectrum, most often above 1 GHz, have power level, at ground, of the order of −120 dBm or less and are generally direct-sequence spread-spectrum signals modulated by pseudo-random codes or similar binary sequences, which are used in the receiver for positioning and navigation. The general functioning of a satellite radiolocalization devices are well known and will be resumed briefly in the description. Reference is also made to patent applications EP1198068 and WO05003807 in the name of the applicant.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, integrating a RF front-end and a GNSS processor, with optionally other functions, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

In the case of the original GPS radiolocalization system, each of the operational GPS satellites, also indicated as Space Vehicle or SV, transmits a navigational radio signal at two carrier frequencies, referenced as "L1" and "L2" and situated at 1572.42 MHz and 1227.60 MHz respectively. The L1 and L2 carriers are modulated by two digital ranging code sequences, called the C/A (coarse acquisition) code and the P(Y) code, the latter being mostly restricted to the US government and military.

The C/A code, which is used by commercial GPS receiver, is modulated in the L1 and in the L2 carriers. C/A codes, which are unique for each GPS satellite, are pseudo-random Gold codes comprising a repetition of a 1023 bits, or "chips", with a transition rate of 1.023 MHz, and are often indicated in short as PRN. The C/A code thus repeats itself every millisecond. The ranging code sequences are synchronized to a common precise time reference, the "GPS time" which is held by precise clocks on board of each satellite, and which are synchronized to a master clock. The effect of the PSK modulation with the C/A code is to spread the spectrum of the modulated signal over a 1 MHz bandwidth.

Other radiolocalization systems, for example the proposed Galileo system and proposed extensions to the GPS system, also employ similar or equivalent signal structures, based on ranging codes synchronized to a common standard of absolute time.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise.

The signal strength of the GPS signals on earth surface is, nominally, −130 dBmW, a value which is further attenuated whenever the view of the sky is obstructed, and especially within buildings. Other satellite navigation systems provide signals of comparable strength. Such levels are well below the noise floor, thus the signal can be received only by use of statistical techniques.

In order to acquire these codes and perform a position fix a GPS receiver generates, for each received satellite, a local replica of the C/A code, the PRN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The phase in which the GPS receiver endeavors to localize a sufficient number of satellite signals in the phase offset—Doppler shift space with little or no knowledge of their position is usually named the "acquisition" state. Once the peaks are found, on the other hand, in the "tracking" state, the system has only to follow their drift, which is usually done with less difficulty or delay.

In order to speed up the acquisition state, many receivers adopt a massively parallel architecture, in which the correlation engine of the receiver comprises a large number of correlators, in order to explore several combinations of time shift and Doppler frequency in parallel. In typical cases, a correlation engine is able to perform correlation of the incoming signal with thousands of code phase-shift/Doppler frequency combinations.

US patent application 2005US-60752032 describes a GNSS receiver in which the acquisition and search process is partitioned into 2 phases whereby in the first phase a short correlation is performed over a contiguous code space and the correlator outputs for each tap are examined for the potential presence of a correlation peak.

The first correlation phase allows to eliminate the larger fraction of all code phases leaving a reduced code space search of around 10% of potential code phases; this offers the ability to reduce the resources and energy required for the search process, however it results in a set of non-contiguous taps and relative code phases, on which a longer correlation needs to be performed.

In a conventional massively parallel correlator a single code generator can be employed to generate a single code sequence which is phase shifted and multiplied by the code to produce contiguous correlator taps, such a code generator architecture is shared between all taps and can be efficiently implemented either as an LFSR (Linear Feedback Shift Register) based state machine, or a RAM based lookup table.

In order to correlate against non-contiguous taps however, it is necessary either to have multiple phase shifted data samples, or multiple code phases. This can be achieved easily by a lookup table code generator, but this requires multiple large RAM tables, since speed of execution precludes sharing the code RAM between all correlators. RAM lookup code generators, besides occupying a large amount of silicon space, also imply larger power consumption, since the RAM tables have to be accessed at high speed. An example of RAM-based code generator is found in U.S. Pat. No. 6,421,372. U.S. Pat. No. 6,208,291 describes a multi-phase code generator delivering contiguous taps of the code to several parallel correlators. WO2004/063897 discloses a software receiver that performs PRN generation in a general-purpose processor.

Conventional LFSR based code generators, on the other hand, are ill-suited to a multi-phase application, since they must be initialized to a known starting phase which differs on each correlation pass. Initialization in this manner either requires that the code generator is stepped to the correct code phase, which requires too many cycles to be practical, or that the code generator is seeded, which would create the same problems as using multiple ram based correlators.

Correlation engines embedded in conventional GNSS receiver having to deal with a large number of independent and spaced-apart code phases at the same time do so at the expense of an increased circuit complexity and cost.

Object of the present invention is to provide a GNSS receiver that can efficiently search correlation peaks in an ensemble of candidates which have noncontiguous phase shifts, without presenting the shortcomings of the known devices.

A further aim of the present invention is to provide a massively-parallel GNSS receiver, and a corresponding code generator, using fewer resources than the conventional ones and that, therefore, can be produced at lower cost.

Another aim of the present invention is to provide a simpler and more economical pseudorandom code generator which can be efficiently initialized to any desired code phase, with a minimal delay.

BRIEF SUMMARY OF THE INVENTION

According to the invention, these aims are achieved by the devices and methods which are the object of the independent claims in the corresponding categories, further optional features of the invention being set forth in the dependent claims and in the description.

BRIEF DESCRIPTION OF THE DRAWINGS

The invention will be better understood with reference to the examples in the detailed descriptions illustrated by the drawings in which.

DETAILED DESCRIPTION OF POSSIBLE EMBODIMENTS OF THE INVENTION

Figure 1:
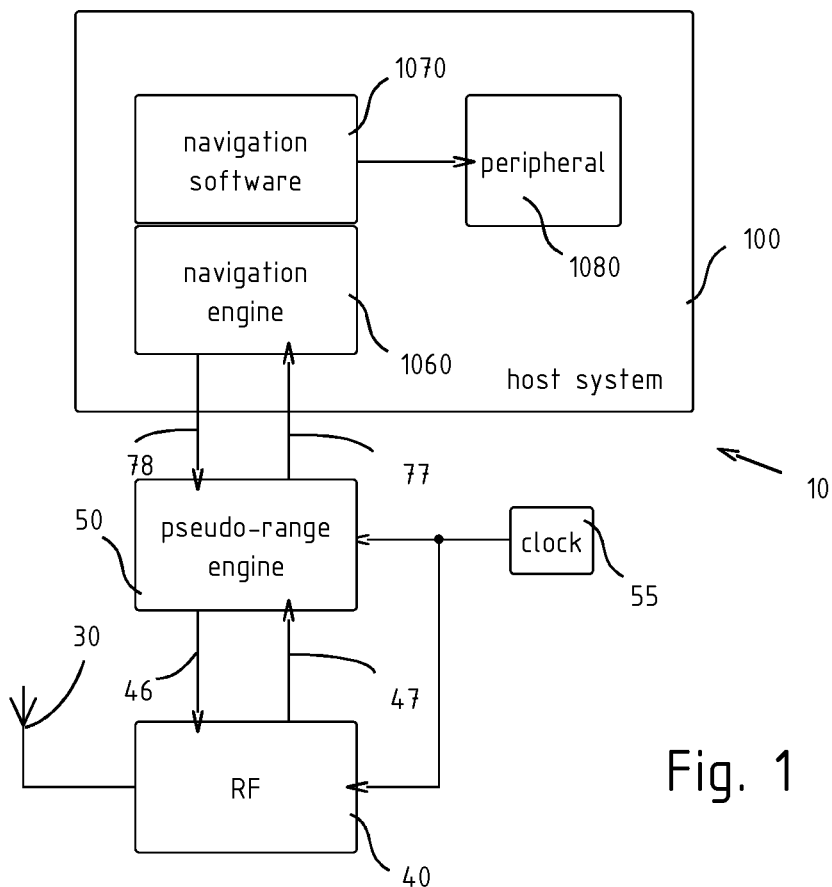
FIGS. 1 and 2 represent a general structure of a GNSS receiver according to one aspect of the present invention.

FIG. 1 represents schematically the layout of a generic GNSS device 10 comprising one or more antennas 30 which allow coupling with radio signals radiated from different GNSS satellites.

According to FIG. 1, the radiolocalization device 10 of the present invention comprises a RF-receiver or radiofrequency module 40, whose function is to process the signals received from the radiolocalization satellites by the antenna 30. The radiofrequency circuit comprises a single- or multiple-conversion heterodyne radio receiver and provides at his output 47 a navigation signal of low frequency, like a baseband signal, analogue or digital, or a low-IF signal, for example a low-If signal at 4.092 MHz.

According to the modulation scheme of the received satellite constellation, the output 47 will comprise several angular component of the signal. In the case of GPS, for example, two components shifted by 90° are needed, and are conventionally referred to as the I (In-phase) and Q (Quadraphase) component. Other modulation schemes, for example the modulation proposed for the GALILEO system, call for more than two angular components.

The RF module 40 is connected to a main time base generator 55, which provides a stable time base reference for the radiolocalization device 10, for example a 32.734 MHz time base. Since time base generator 55 must be considerably precise and stable to allow acquisition and tracking of the GPS signal, it comprises generally a high-quality temperature compensated crystal oscillator or TCXO.

The output 47 of the RF module 40 is fed to a signal processor 50, also called pseudo-range engine 50 which, in turn, provides control instructions 46 to the RF circuit 40. The function of the pseudo-range engine 50 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 50 are transmitted to the navigation engine 1060, which calculates a fix for position and time coordinates x, y, z, t. The navigation engine also steers the pseudo-range engine 50 by appropriate search instructions 78. The positional fix is usually obtained by iterative Kalman filters, or by other known means, and the navigation engine may need to follow the pseudo-range data 77 along several code periods until a satisfactory solution is found.

Preferably the pseudo-range engine 50 and the RF module 40 are realized as two separate integrated circuits or as a single common integrated circuit.

In the illustrated variant of the invention the navigation engine 1060 is part of a host system 100, which also comprises application navigation software 1070 and appropriate peripherals 1080 for interaction with a user. The radiolocalization device 10 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine. In this case the functions of the navigation engine 1060 and of the pseudo-range engine 50 could conveniently be grouped in a single-chip device.

In the case of a multi-standard GNSS radiolocalization device, the received satellites may belong to several satellite constellations, for example to the GPS, Galileo, or GLONASS constellations, and emit in several radio bands.

Preferred embodiments of the invention have circuitry elements or the software equivalents thereof for performing correlation. Such elements, when broken down into abstracted, individual units, may be referred to as "taps", with reference to a classical correlation architecture based on tapped shift registers. It must be kept in mind, however, that the present invention is not limited to this particular architecture, and that the term "tap" designates here an abstract correlation unit, arranged to produce a correlation value, and which may also be partially or totally realized in software.

Figure 2:
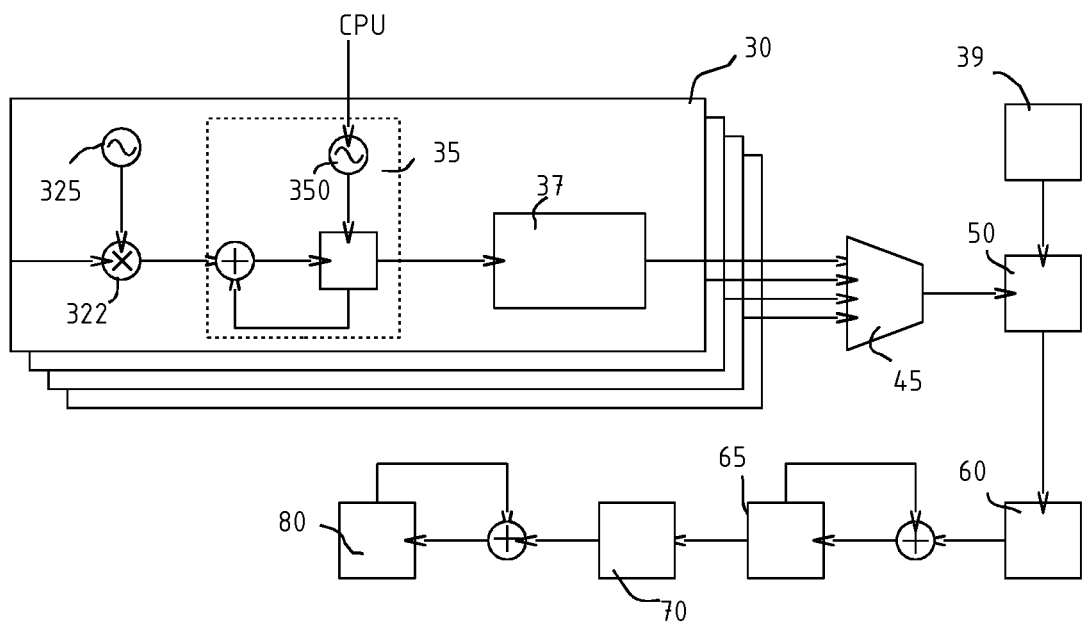

According to FIG. 2, the GNSS processor of the invention comprises a carrier wipeoff stage, comprising a mixer 322 and a local oscillator 325, which removes an estimated or known carrier wave from the digital samples providing a baseband signal, as it is known in the art. Such carrier wipeoff circuits are typically shared by a number of different correlators. The processor further includes at least one sampling stage 35 for recording the carrier-stripped data in the baseband signal in a pre-correlation buffer 37. The sampling stage is clocked by the code NCO 350, whose rate is controlled, for example by the CPU (not represented) according to the Doppler shift of a satellite whose acquisition is intended. The pre-correlation samples in buffer 37 are, therefore, automatically sampled in chip units or, preferably, in fractional chip length units, but always maintaining a fixed alignment with the chip boundaries, and one can avoid the sample-alignment logic needed to accommodate Doppler shifts of the SV.

Since each SV has an independent and different Doppler shift, the processor of the invention preferably comprises a plurality of code-generators code NCO 350 and pre-correlation buffers 37. This parallelization of resources with respect to SV contributes to the processing power of the GNSS processor.

The data stored in pre-correlation buffer 37 is processed in several stages of correlation, with respect to locally generated PRN codes, in order to identify a maximum of GNSS signals, each determined by a pair of Doppler shift/code phase values corresponding to a correlation peak.

Data stored in pre-correlation buffers 37 are correlated at high speed in correlators 250, with local replica codes generated by code generators 39. The SV signal needs compensating for both code and carrier Doppler, however since the carrier rate is 1540 times the code Doppler the losses due to code Doppler can be ignored for most practical purposes, and in particular in the correlators 250, provided the data is sampled within a few tens of mHz of the actual code Doppler. Preferably, each correlator operates, by multiplexer 45, on data provided by several independent channels 30, each channel being dedicated to the acquisition of one determined SV. The correlator output is fed to the DFT engine 60 to increase the frequency search space for each correlation. This imposes some constraints on the maximum search time against the code Doppler, in order to limit gain losses due to the gradual drift of the replica code against the actual code. Up to about ⅓ chip offset it is still possible to usefully accumulate the results through a DFT. Additionally there is a loss in the DFT on lines further from the centre frequency so the DFT is limited, for example, to 8 lines.

Importantly, the processing of data stored in pre-correlation buffer 37 is carried out at a speed much higher than the original data rate. In such a way that the receiver of the invention can effectively provide a large number of correlation values for various taps. In one practical example, each correlation channel is capable to provide a full 1023 point correlation value every 4 μs, this being the rate that the DFT is able to process in real time, without the need of an intermediate buffer. The system provides thus a 256-fold acceleration with respect to the real data rate. An even larger number of taps, for example 4 k taps, can be obtained by providing several physically independent correlators.

Referring again to FIG. 2, The DFT unit 60 provides coherent integration values having both a real (I) and an imaginary part (Q). These are fed, after integration in the coherent accumulator 65, to the amplitude processor 70 which calculates absolute correlation values and accumulates the result in an incoherent integration buffer 80. Since the amplitude of the correlation values are by definition non negative values, the data in the incoherent integration buffer are non-decreasing function of time. Preferably, and according to another aspect of the invention, the amplitude processor 70 subtracts a baseline value from the incoherent integration data, and stores in the buffer 80 only the part exceeding the baseline. In this way, the data stored in the buffer are smaller, thus the size and power consumption of buffer 80 can be reduced.

Figure 3:
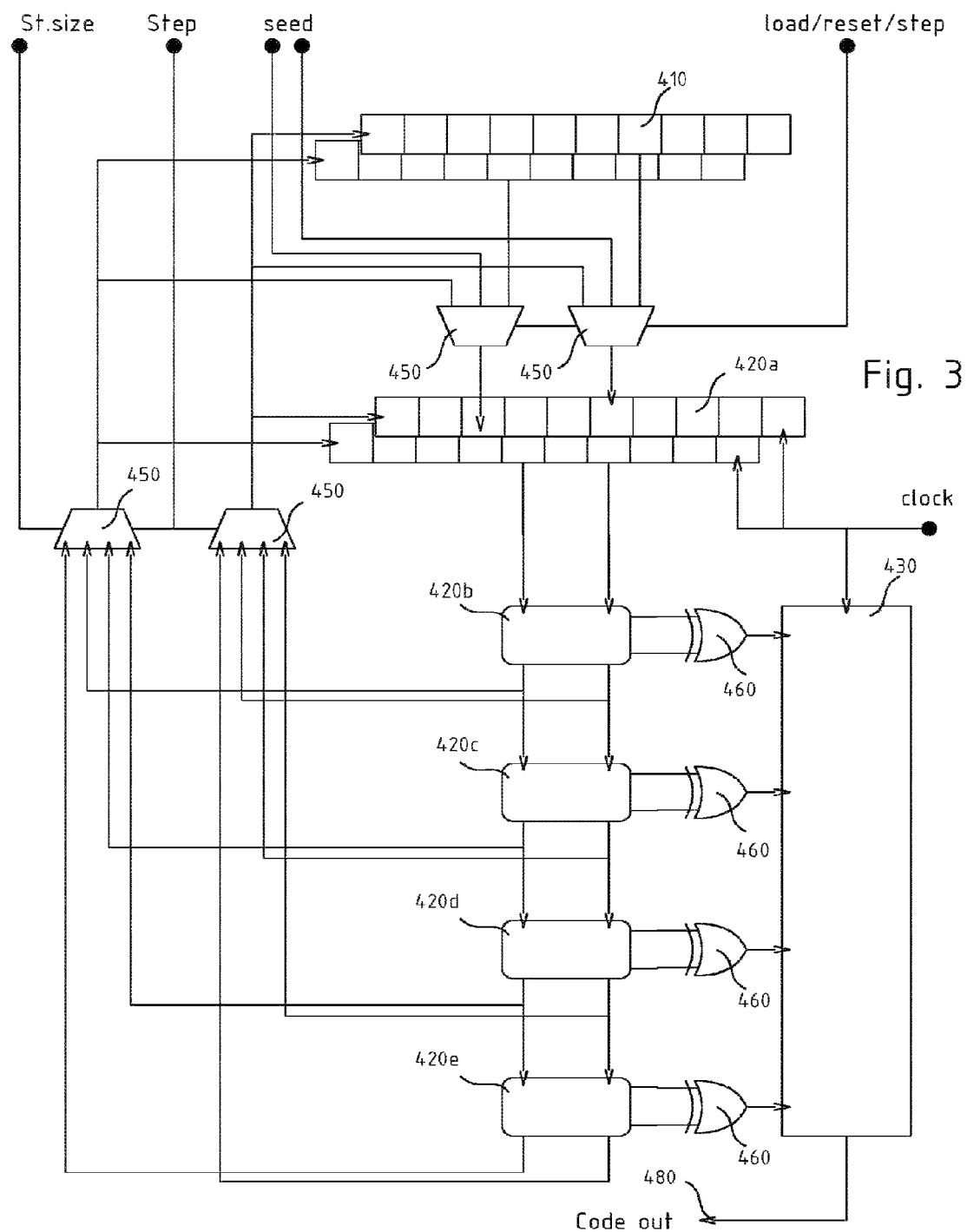
FIG. 3 shows, in a simplified way, the structure of a modified LFSR Gold code generator corresponding to one aspect of the invention.

FIG. 3 shows a Gold code generator according to one aspect of the invention. In the presented example, relative to a GPS receiver, the code generator includes a controlling state machine and a pair of LFSR (linear feedback shift register) state machine, Each LFSR comprises a shift register 420*a* and a series of identical combinatorial generator functions 420*b*-420*e*, each of which has a depth of N bits for a code length of $2^N-1$ where N=10 for the 1023 chip GPS Gold code. Generator functions are chained to produce a series of consecutive Gold code chips for the selected SV to generate, in a known way, according to the need, all the PRN codes used in GPS C/A signal, these bits are latched in output registers 430.

At each clock cycle, the content of the shift registers 420*a* is transformed in the generator functions 420*b*-420*e* and the output bit for each chip is copied into the register 420*a*, and copied in the successive register. In this way the code generator steps, at each clock cycle, over 1, 2, 3 or 4 codes in the Gold sequence. The XOR gates 460 provide, at the output 430, 4 successive codes of the selected Gold code sequence.

The programmable selector 450 is arranged to allow the registers 420a to be loaded with one of the four code generator function outputs 420b-420e allowing the code to be advanced by 1 to 4 chips. According to a simplified realization (not shown), the programmable selector 450 could be arranged to allow only a sub-set of the possible steps. For example it could be arranged to select only steps of 4 codes or single steps.

If necessary, the code generator of the invention could be adapted to generate a number N of codes on any clock cycle, where, for example N=2, 4, 8, 16, or any number of codes. At the same time the invention also includes the case of a simpler code generator, which steps through all the codes of the desired pseudorandom sequence one by one. The code generator could also provide the possibility to step back in the phase sequence, as well as forward.

As mentioned above, LFSR generator are attractive because they are easily programmable and do not use a large amount of memory in the implementation. They can not easily be addressed to an arbitrary position in the code, however. In the worst case, 1022 clock cycles are required to align the code generator to the desired position.

This limitation of LFSR generators can be troublesome in GPS receptors with parallel correlation architecture, where the correlator must switch quickly from one tap to another. To overcome this problem the code generator of the invention includes a state memory 410 arranged to store the output of the code generator functions 420a, upon reception of a 'save' instruction. The 'reset' instruction, on the other hand, causes a restore of the state of shift registers to the values stored in state memory 410.

Since during each correlation we perform correlation over a minimum of 1023 chips it is apparent that all code phases are generated by the code generator in each correlation cycle, therefore, if the system knows in advance the code phase that will be used in the next correlation pass, it can to take a snapshot of the code generator state during one correlation pass at the point where it is very close to the required code phase for the start of the next correlation pass, and store it in state memory 410 for future use. For example, in the illustrated architecture, the system may save a state of the shift registers 420, from which the desired point in the code sequence can be reached in at most three cycles.

State memories 410 can be dedicated data registers or also, without departing from the scope of the invention, they may be external to the code generator. It could be, for example a memory area in the addressable space of the CPU, and it could also be used to store the registers 420a, generator functions 420b-420e, logic unit 460, output registers 430, or other variables and data, as the circumstances suggest. The state memories 410 can be directly accessible from the code generators, or require the intervention of the CPU or of an external controller. The linear shift registers 420a-420d and the logic units 430 constitute a state machine, arranged to generate a cyclic sequence of codes, corresponding to a cyclical sequence of internal states, which could be implemented in different ways, without departing from the scope of the invention.

According to another variant of the invention, the code generator is arranged to save its internal state in the state memory 410, not immediately upon reception of the store command, but at a later instant, when the generated code reaches a preset phase value, or after a set number of clock cycles.

Figure 4:
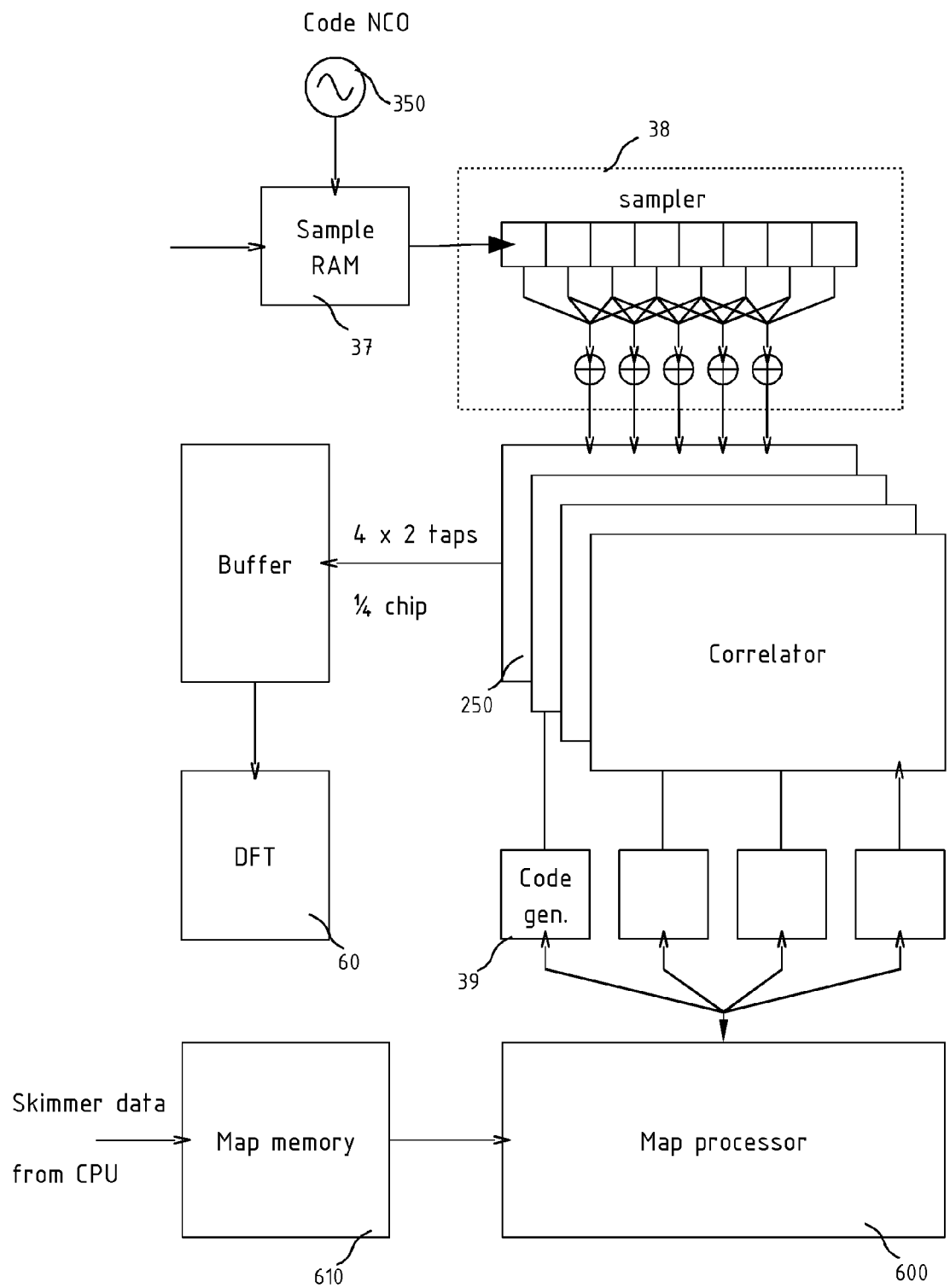
FIG. 4 is a block diagram illustrating schematically the structure of a GNSS receiver according to one aspect of the invention.

FIG. 4 illustrates a possible disposition of a signal processor according to the invention which takes advantage off the features described above. As already mentioned the digitalized received signal is stored in the sample ram 37, which is the pre-correlation buffer. A sampler 38 is used to combine several adjacent samples, in order to provide data having the requested granularity by the correlators 250.

The correlators 250, of which four are represented in FIG. 4, but can be in any number, according to the circumstances, correlate at high speed the data from the sampler and the PRN sequence generated by the respective code generators 39, which are controlled by the map processor 600.

According to one aspect of the invention, the map processor 600 obtains a list of candidate taps, which are supposed to contain at least some genuine SV signals, selected in advance by a 'skimmer' correlation processor. The skimmed taps are, for example, stored in a map memory area 610, and transferred to the map processor 600 under control of the CPU.

Figure 5A:
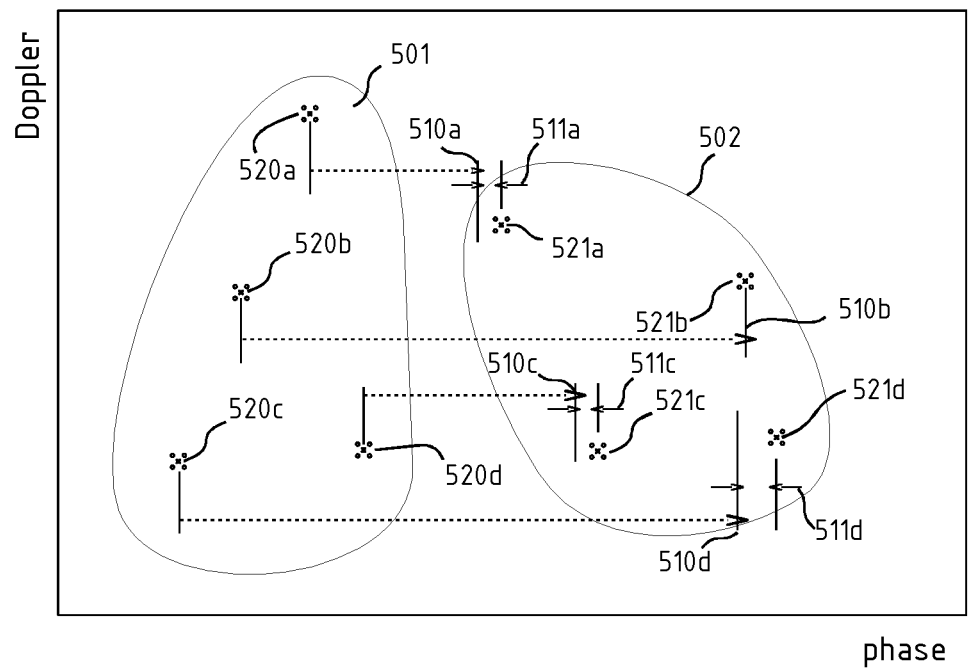
FIGS. 5a and 5b illustrate an aspect of the map processor unit of the invention.

FIG. 5a is used to show, in a very simplified way, the principle of functioning of map processor 600. This obtains, for example from the CPU, a list of taps, for which a correlation is required, which are represented, for each Space Vehicle, by a pair of Doppler/code shift values, represented by the crosses 520 in the diagram. In the example shown, for the sake of simplicity, the list includes only eight taps, to be distributed among four available correlators, so at least two consecutive correlation cycles will be needed. In a real case the list of taps could be of course much longer and require more consecutive correlation cycles, as far as the speed of the correlators allows.

Map processor 600 selects the subset of taps 501 and 502, that will be processed in the first, respectively in the second correlation cycle. Supposing that the system comprises four independent code generators 39 and correlators 250 (visible on FIG. 4), the map processor initially initializes, if necessary, the code generators with the identifier of the code sequence unique to the SV that is searched, then slews or sets the code generators to the phases required by the first subset 501 in order to start the first correlation on these four taps. While the correlation cycle proceeds, the code generators 39 will generate, in rapid succession, all the codes in the Gold code sequence relative to the SV that is searched.

The map processor 600 selects, for each of the available correlators, the tap that is to be analyzed in the successive correlation cycle, from the subset 502 and pre-calculates the phases 510a-510d at which each of the correlators will be very close to the code phase used in the successive correlation cycle, and issues a store command accordingly, in order to store the status of the code generator at that point, for example in the state memories 410 of the code generators (FIG. 3), or in some other suitable storing location. Once the first correlation cycle is completed, the map processor 600 only has to restore the previously stored status and, advancing each code generator by at most three steps, in order to align all the generators to the desired phases, and start the next correlation cycle.

In the shown example, the save points 510a-510d do not necessarily coincide exactly with the desired starting points 521a-521d, but fall in some cases a little ahead in phase. The reason for that is that he code generators 39 do not step through all the phases of the Gold code sequences, but, as in the example discussed above with reference to FIG. 3, may be arranged to step two, three, four or more codes at every clock cycle. In this case, the map processor will be programmed to issue a store command at some point in advance of the desired code phase, or in correspondence with the code phase just before the desired code phase. In the example shown the store points 510a, 510c have an advance 511a of one chip to tap 521a, respectively 510c, the store point 510b is exactly on the phase of tap 510b, because the phase difference between taps 520b and 521b was, in this case, an exact multiple of four, and the store point 510d has an advance 511d of two chips to tap 521d. The map processor computes and store these advance values in an appropriate memory area (not shown). Alternatively, they can be stored, together with the status of the shift registers, in the state memory 410 of the code generators themselves (FIG. 3).

Once the correlation on the first subset is completed the map processor 600 starts the correlation on the taps contained in the second subset 502. To this effects, it issues restore commands to the correlators, in order to restorer the state of the shift registers corresponding to save points 510a-510d. It then advances the code generators which are not exactly in phase with the desired tap, if necessary and according to the value stored in the previous step. At this point the code generators are aligned with the phases of taps 521a-521d, and the correlation can start.

The map processor ensures that the code generators, at the beginning of any correlation cycle (except the first one) are almost aligned with the phases of the desired taps. "Almost aligned" meaning, in the context of the present application, that the code generators are set at a phase that equal or is slightly advanced with respect the desired tap, and from which the code phase of the desired tap can be attained in a limited number of cycles, for example no more than 16 cycles, preferably no more than eight or four cycles. If the code generator is capable of back-stepping, the saved state of the code generator could be slightly retarded from the desired tap.

Figure 5B:
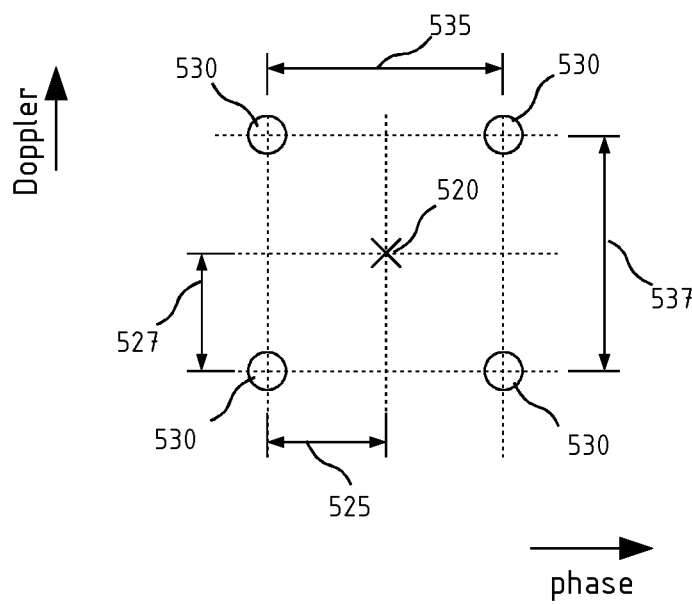

FIG. 5b illustrates another aspect of the invention relating to the correlation cycles. The taps candidates 520 provided by the first "skimmer" correlation operation are examined and analyzed with more accuracy in the successive "distiller" correlation operation, in order to extract those candidate that have a very high likelihood to correspond to a true radiolocalization signal. The distiller preferably carries out four correlations 530 for each skimmer candidate 520, bracketing it both in code phase and in Doppler shift. The map processor is arranged to execute, for each skimmer candidate 520, two correlations spaced by a fixed amount 535, for example ½ chip, while the DSP processor 60 is arranged to look into two adjacent Doppler lines separated by a set amount 537. In this way the distiller correlation process produces four taps 530 corresponding to two code phases at ±¼ chip from the central phase provided by the skimmer, and two Doppler frequencies spaced by ±½ DFT line spacing from the central frequency. In order to centre the initial candidate 520 between the points 530, the latter are shifted by a code phase offset 525 and a Doppler offset 527, preferably corresponding to one half of the spacing 535, respectively 537. This shift can be introduced by shifting the phase and the frequency of the code NCO 350 (FIGS. 2 and 4)

The invention claimed is:

1. A pseudo random noise (PRN) code generator, for providing a PRN sequence in a global navigation satellite system (GNSS) receiver, comprising:
   a clock terminal and a state machine, the state machine comprising shift registers and a series of combinatorial generator functions that produce a plurality of code generator function outputs, the state machine generating a cyclic sequence of chips, corresponding to a cyclical sequence of states of the state machine, wherein the code generator is arranged to generate, for each clock cycle of the clock terminal, a series of N chips of the PRN sequence;
   a state memory that is distinct from the state machine and that saves one or more of the cyclical sequence of states of the state machine, wherein the state memory restores the state of the code generator, previously saved, after correlation for a first candidate signal is completed and before correlation for a successive candidate signal is started; and
   a programmable selector that is coupled to the series of combinatorial generator functions and that allows the shift registers in the state machine to be loaded with one of the plurality of code generator function outputs.

2. The PRN code generator of claim 1, wherein the number N of chips generated for each clock cycle is programmable.

3. The PRN code generator of claim 1, wherein the number N of chips generated for each clock cycle is equal or larger than four.

4. The PRN code generator of claim 1, wherein the PRN code generator is controllable in order to save the state of the state machine into the state memory at a chosen point in time, at which the phase of the generated PRN sequence has a value, and is further controllable to set the state machine in the state saved in the state memory, thus setting the phase of the generated PRN sequence to said value.

5. The PRN code generator of claim 4, arranged to save the state of the state machine into the state memory when the generated PRN sequence reaches a preset phase value.

6. The PRN code generator of claim 4, arranged to save the state of the state machine into the state memory after a set number of clock cycles from the reception of a save command.

7. The PRN code generator of claim 4, arranged to save the state of the state machine into the state memory upon reception of a save command.

8. The PRN code generator of claim 1, wherein at each clock cycle content of the shift registers in the state machine is transformed in the combinatorial generator functions.

9. The PRN code generator of claim 8, further comprising:
   output registers coupled to the shift registers; and
   a plurality of exclusive or gates that couple the combinatorial generator functions to the output registers.

10. A GNSS receiver, comprising:
    one or more PRN code generators, each PRN code generator comprising:
    a clock terminal and a state machine, the state machine comprising shift registers and a series of combinatorial generator functions that produce a plurality of code generator function outputs, the state machine generating a cyclic sequence of chips, corresponding to a cyclical sequence of states of the state machine, wherein the code generator is arranged to generate, for each clock cycle of the clock terminal, a series of N chips of the PRN sequence;
    a state memory that is distinct from the state machine and that saves one or more of the cyclical sequence of states of the state machine; and
    a programmable selector that is coupled to the series of combinatorial generator functions and that allows the shift registers in the state machine to be loaded with one of the plurality of code generator function outputs; and
    a map processor unit, arranged to control the PRN code generators in order to generate, in succession, correlation data for candidate signals, the one or more PRN code generators being so controlled to store, while generating the code for a first candidate, one of the states of the code generators at a phase close to that at which the PRN sequence for a successive candidate will start, in the state memory, and to restore, after the correlation for the first candidate is completed and before the correlation for the successive candidate is started, the state saved in the state memory.

11. The GNSS receiver of claim 10, wherein the map processor unit is arranged to store a phase difference between the saved state of the PRN code generators and the PRN sequence for which the successive candidate will start, and to step the PRN code generators, before the correlation for the successive candidate, to compensate the phase differences.

12. An apparatus for providing a pseudo random noise (PRN) sequence in a global navigation satellite systems (GNSS) receiver, comprising:
 means for generating a clock cycle;
 means for transitioning between multiple states, wherein the means for transitioning comprises a series of combinatorial generator functions that produce a plurality of code generator function outputs;
 means for generating a cyclic sequence of chips, corresponding to a cyclical sequence of states of the means for transitioning;
 means for generating a series of N chips of the PRN sequence for each clock cycle;
 means for saving one or more of the cyclical sequence of states of the means for transitioning, wherein the means for saving restores the state of the means for generating a cyclic sequence of chip, previously saved, after correlation for a first candidate signal is completed and before correlation for a successive candidate signal is started, wherein the means for saving is distinct from the means for transitioning between multiple states; and
 means for loading one of the plurality of code generator function outputs into registers in the means for transitioning between the multiple states, wherein the means for loading is coupled to the means for transitioning.

13. The apparatus of claim 12, wherein the number N of chips generated for each clock cycle is programmable.

14. The apparatus of claim 12, wherein the number N of chips generated for each clock cycle is equal or larger than four.

15. The apparatus of claim 12, wherein the means for saving comprise means for saving the state of the means for transitioning at a chosen point in time, at which the phase of the generated PRN sequence has a value, and is further controllable to set the means for transitioning in the state saved in the means for saving the state, thus setting the phase of the generated PRN sequence to the value.

16. The apparatus of claim 15, wherein the means for saving comprise means for saving the state of the means for transitioning when the generated PRN sequence reaches a preset phase value.

17. The apparatus of claim 15, wherein the means for saving comprise means for saving the state of the means for transitioning after a set number of clock cycles from receiving a save command.

18. The apparatus of claim 15, wherein the means for saving comprise means for saving the state of the means for transitioning upon receiving a save command.

19. A method for providing a pseudo random noise (PRN) sequence in a global navigation satellite systems (GNSS) receiver, comprising:
 generating a clock cycle;
 transitioning between multiple states in a state machine, the state machine comprising shift registers and a series of combinatorial generator functions that produce a plurality of code generator function outputs;
 generating a cyclic sequence of chips, corresponding to a cyclical sequence of states of the state machine;
 generating a series of N chips of the PRN sequence for each clock cycle;
 saving one or more of the cyclical sequence of states of the state machine in a state memory that is distinct from the state machine, wherein the state memory restores the state of the code generator, previously saved, after correlation for a first candidate signal is completed and before correlation for a successive candidate signal is started; and
 loading, via a programmable selector that is coupled to the series of combinatorial generator functions, one of the plurality of code generator function outputs into registers in the state machine.

20. The method of claim 19, wherein the number N of chips generated for each clock cycle is programmable.

21. The method of claim 19, wherein the number N of chips generated for each clock cycle is equal or larger than four.

22. The method of claim 19, wherein the saving comprises saving the state of the state machine at a chosen point in time, at which the phase of the generated PRN sequence has a value, and is further controllable to set the state machine in the state saved in the state memory, thus setting the phase of the generated PRN sequence to the value.

23. The method of claim 22, wherein the saving comprises saving the state of the state machine when the generated PRN sequence reaches a preset phase value.

24. The method of claim 22, wherein the saving comprises saving the state of the state machine after a set number of clock cycles from receiving a save command.

25. The method of claim 22, wherein the saving comprises saving the state of the state machine upon receiving a save command.

* * * * *